Nov. 9, 1965   W. E. GIFFORD   3,216,484
CRYOGENIC REGENERATOR
Filed Sept. 9, 1960

Inventor
William E. Gifford
by Roberts, Cushman & Grover
Att'ys

United States Patent Office 3,216,484
Patented Nov. 9, 1965

3,216,484
CRYOGENIC REGENERATOR
William E. Gifford, Lexington, Mass., assignor, by mesne assignments, to International Business Machines Corporation, New York, N.Y., a corporation of New York
Filed Sept. 9, 1960, Ser. No. 55,002
11 Claims. (Cl. 165—4)

This invention relates to thermal storage devices known as regenerators or accumulators, and particularly to regenerators used in cryogenic refrigeration apparatus at very low temperatures, that is, temperatures below about 50° Kelvin.

These very low temperatures are now an essential environment for superconductive devices such as the cryotron disclosed in United States Patent 2,832,897, issued to Dudley A. Buck, and persistent current memories. Presently known superconductive elements function only at or below critical temperatures ranging from a fraction of 1° K. to approximately 18° K. In addition to superconductive devices other devices such as infrared detectors and masers have substantially improved operation at very low temperatures.

Very low temperatures have in the past been obtained by first reducing a refrigeration fluid such as hydrogen or preferably helium to temperatures somewhat above 50° K. through a regenerative expansion process, then using successive expansion stages and heat exchangers further to reduce the temperature of the gas and in some cases finally allowing the gas, highly compressed, to expand through a throttling valve (Joule-Thomson process). Apparatus performing the regenerative expansion process include a regenerator which is essentially a conduit or enclosure filled with a heat absorbing mass through which the regrigeration fluid flows reversibly, giving up heat to the regenerator prior to expansion cooling, and receiving heat after cooling.

It is highly desirable to achieve very low temperatures solely by the first-mentioned process, regenerative expansion, and to omit the intermediate multiple-expansion, heat exchange process and the Joule-Thomson process. However, hitherto it has not been considered possible to use a regenerator effectively below approximately 50° K. At lower temperatures known regenerators fail to store sufficient refrigeration to contribute to further reduction in temperature.

A regenerator made according to the present invention may be used with expansion engines such as that shown in United States Patent No. 2,906,101 to produce temperatures well below 50° K., and in fact has been used to produce temperatures below 20° K.

A regenerator according to the present invention comprises a plurality of screens; an enclosure having an inlet and outlet through which fluid flows; means maintaining said screens in vertical spaced relationship within said enclosure; and each of said screens exhibiting at said very low temperatures both a relatively high thermal capacity and a relatively high thermal conductivity, simultaneously.

For the purpose of illustration typical embodiments of the invention are shown in the accompanying drawing in which.

Figure 1:
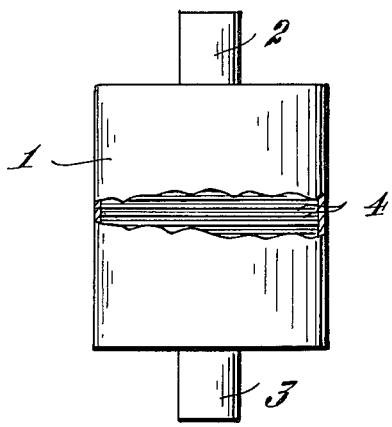
FIG. 1 is a side elevation of a very low temperature regenerator according to the invention.
Figure 2:
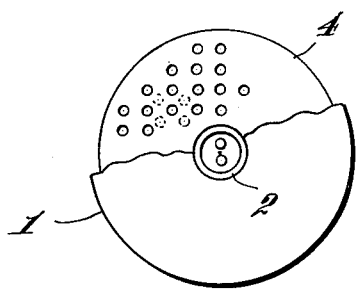
FIG. 2 is a plan view of the regenerator, partly broken away.
Figure 3:
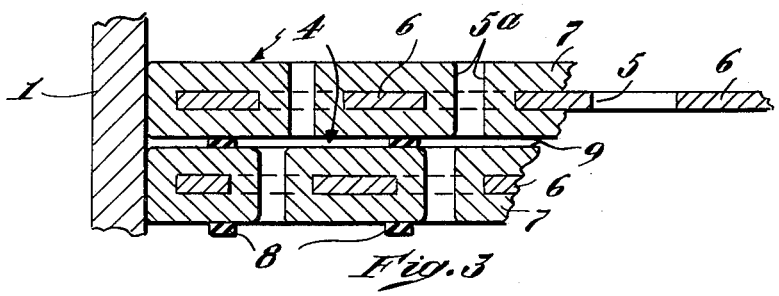
FIG. 3 is an enlarged sectional view showing details of the construction of the regenerator of FIGS. 1 and 2.

The regenerator shown in FIGS. 1 to 3 comprises a tubular, stainless steel enclosure 1 having ports 2 and 3 entering the enclosure. Within the enclosure are a stack of, for example, 50 to 200 perforate disks or screens 4 which, generally speaking, fill the interior volume of the enclosure. The inner diameter of the enclosure is such that the disks are not snugly or press-fitted against the enclosure but are confined with a minimum of space between their outer edges and the enclosure.

In FIG. 3 is shown in detail a typical form of the present regenerator. Each of the screens 4 comprises a perforate sheet 6 of relatively strong metal such as copper which has a relatively high heat conductivity, in the order of 100 to 200 b.t.u./hr. ° F. ft. at 20° K. Other materials, such as silver, aluminum, crystalline aluminum oxide, and crystalline quartz, may be used. By way of example, the sheet is approximately 0.003 to 0.008 inch thick and is perforated with holes 5 of 0.02 inch diameter or the equivalent if the holes are not round. The holes are spaced 0.10 inch apart. The overall diameter of the screens will vary according to the volume of refrigeration fluid being used, but is typically one-half to one inch. A typical enclosure length is two to five inches. Of course larger and smaller regenerators may be used, depending on the refrigeration required. Over the perforate sheet 6 is plated a body of material having a relatively high heat capacity, in the order of 2 to 4 cal./gram mole ° K. at 20° K. A suitable material is lead (Pb), but other materials and alloys thereof such as mercury, and mercury-lead alloys may be used. The body 7 is plated to a thickness of 0.005 to 0.008 inch and the perforations 5 of the supporting screen 6 are filled in to an equivalent diameter 5a of 0.005 to 0.010 inch, for example, Preferably, the lead is fairly pure and the copper is extremely pure.

The screens are provided with spacers 8 of insulative material such as plastic stripes painted on the coating 7. The spacers are sufficiently thick, 0.001 to 0.01 inch, to provide spaces 9 for fluid flow between the screens 4, of the same order of width as the perforations 5a, but the free volume within the cylinder 1, including the reduced perforations 5a and spaces 9, is kept low in relation to the volume of the screens. Preferably the free volume is 3% to 20% of the volume enclosed by the cylinder 1, and the lead bodies occupy 60% to 90% of the volume enclosed by the cylinder. With screens as described above a regenerator 1″ in diameter and 5″ in length has a pressure drop of 3 to 5 p.s.i. with an applied pressure of 200 p.s.i. at 30° K.

Figure 4:
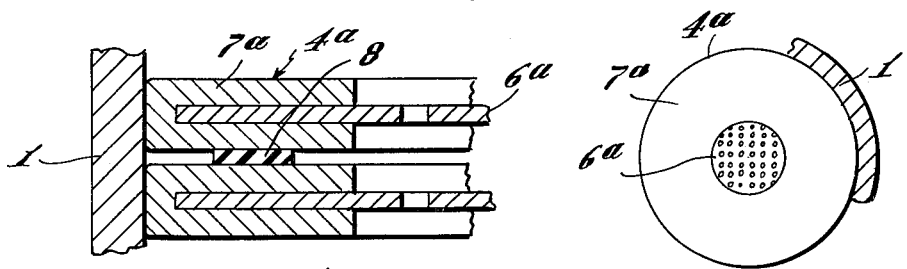
FIG. 4 is a view like FIG. 3 showing another form of regenerator.
Figure 5:
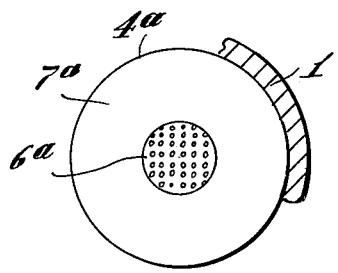
FIG. 5 is a sectional view like FIG. 2 of the regenerator of FIG. 4.

Alternatively, as shown in FIGS. 4 and 5, a lead plating 7a is applied only at the periphery of each copper sheet 6a which has a small central, perforate area exposed to the refrigeration fluid. The diameter of the central area may, for example, be one-third that of the plated lead ring 7a at the periphery. Spacers 8 need be applied only to the peripheral lead ring. Such a screen has the advantage that the copper exchanges heat with the fluid directly and hence more rapidly.

Figure 6:
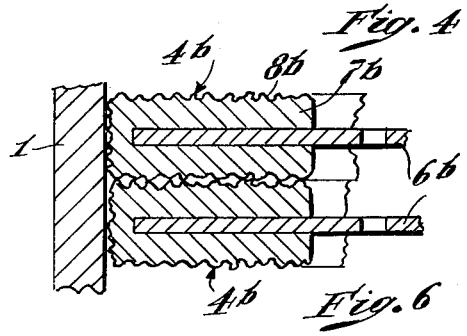
FIG. 6 is a view like FIG. 3 showing a further form of regenerator.

As shown in FIG. 6 the spacing means may be provided by roughening the surfaces 8b of the lead plating whether the lead covers the copper sheet completely or only peripherally.

When stacked within the enclosing cylinder 1, the series of disks form a multiplicity of somewhat tortuous paths between the ports 2 and 3. However, the paths can be kept uniform by control of the lead plating and spacers so that the pressure drop between ports is minimized. As refrigeration fluid flows from port to port it comes in contact with large areas of lead or copper which receive or give up heat distributed rapidly through the screen, by the copper sheets, each of the lead bodies acting as a heat sink. Because each screen functions independently of, and is spaced from, the others, heat conduction along the series, that is, normal to each screen, is kept very low. Particularly important is the fact that the lead plating prevents any contact between the highly conductive copper sheets. The stainless steel cylinder also conducts very little heat in the cryogenic range.

Such a regenerator operates efficiently at temperatures below 50° K., a range not hitherto entered effectively by regenerators, and enables expansion apparatus to achieve cryogenic temperatures directly, a result previously thought impossible.

I claim:
1. A very low temperature regenerator comprising a series of screens, each screen having opposite faces and the series extending normal to said faces, and an enclosure of relatively low heat conductivity having inlet and outlet ports holding the screens in series and conducting fluid flow therethrough, each of said screens comprising a sheet of material selected from the group consisting of copper, silver, aluminum, crystalline aluminum oxide and crystalline quartz and a body of material selected from the group consisting of lead, mercury and alloys thereof thermally bonded to the sheet, said sheet having a plurality of apertures therethrough and said screens being spaced apart to permit fluid flow through said apertures and along the faces of said screens, said body being adapted to serve as a sink for heat received from fluid and said sheet being adapted to support said body and conduct heat transversely of the sheet thereby to distribute heat uniformly through the body.

2. The regenerator according to claim 1 wherein said body comprises a coating over the faces of said sheet said coating being formed of material selected from the group consisting of lead, mercury and alloys thereof.

3. The regenerator according to claim 1 wherein said body is located at the periphery of said sheet and extends partially over opposite faces of the sheet.

4. The regenerator according to claim 3 wherein said screens are spaced by abutment of peripheral bodies on adjacent screens, said bodies having roughened surfaces to reduce thermal conductivity between bodies of adjacent screens.

5. The regenerator according to claim 1 wherein said screens are spaced apart by an insulating material and are held in series solely by said enclosure, thereby to minimize heat conduction longitudinally of the series.

6. The regenerator according to claim 3 wherein said apertures have an equivalent diameter of the order of 0.001 to 0.01 inch.

7. The regenerator according to claim 1 wherein the equivalent diameter of said apertures and the spacing of said plates is in the order of 0.005 to 0.01 inch.

8. The regenerator according to claim 1 wherein said sheet and said body have said relatively high heat conductivity and relatively high heat capacity respectively in the temperature range of approximately 0° to 50° Kelvin.

9. A very low temperature regenerator comprising a series of screens, each screen having opposite faces and the series extending normal to said faces, and an enclosure of relatively low heat conductivity having inlet and outlet ports and holding the screens in series and conducting fluid flow therethrough, each of said screens comprising a sheet of copper and a body of lead thermally bonded to the sheet, said sheet having a plurality of apertures therethrough and said screens being spaced apart to permit fluid flow through said apertures and along the faces of said screens, said body being adapted to serve as a sink for heat received from fluid and said sheet being adapted to support said body and conduct heat transversely of the sheet thereby to distribute heat uniformly through the body.

10. A regenerator for operation at very low temperatures comprising,
(a) an enclosure of low thermal conductivity having a fluid port at each end, and
(b) a plurality of adjacent screens within said enclosure, each said screen including first and second bodies of different materials,
(1) the first body of material selected from the group consisting of copper, silver, aluminum, crystalline aluminum oxide and crystalline quartz,
(2) the second body of material selected from the group consisting of lead, mercury and alloys thereof, and
(3) one of each adjacent screen including means of low thermal conductivity engaging an adjacent screen for thermally insulating adjacent screens,
(4) each of said screens having over an area thereof a plurality of apertures therethrough, and said first and second bodies extending throughout a substantial portion of said area.

11. The regenerator according to claim 10 wherein said enclosure and screens define a free volume of 3% to 20%, and the first said bodies occupy a volume of 60% to 90%, of the volume within said enclosure.

References Cited by the Examiner

UNITED STATES PATENTS

| Re. 19,140 | 4/34 | Frankl | 257—262.1 |
| 1,734,274 | 11/29 | Schubart | 257—262.15 |
| 1,863,586 | 6/32 | Wilke | 257—256 X |
| 2,790,505 | 4/57 | Dow | 257—263 X |

FOREIGN PATENTS

| 669,040 | 3/52 | Great Britain. |
| 779,769 | 7/57 | Great Britain. |

CHARLES SUKALO, *Primary Examiner.*

HERBERT L. MARTIN, PERCY L. PATRICK,
*Examiners.*

UNITED STATES PATENT OFFICE

CERTIFICATE OF CORRECTION

Patent No. 3,216,484 November 9, 1965

William E. Gifford

It is hereby certified that error appears in the above numbered patent requiring correction and that the said Letters Patent should read as corrected below.

Column 3, line 50, for the claim reference numeral "3" read -- 1 --.

Signed and sealed this 26th day of July 1966.

(SEAL)
Attest:

ERNEST W. SWIDER
Attesting Officer

EDWARD J. BRENNER
Commissioner of Patents